United States Patent

Kim et al.

[11] Patent Number: 5,805,476
[45] Date of Patent: Sep. 8, 1998

[54] VERY LARGE SCALE INTEGRATED CIRCUIT FOR PERFORMING BIT-SERIAL MATRIX TRANSPOSITION OPERATION

[75] Inventors: Kyeoun Soo Kim; Soon Hwa Jang; Soon Hong Kwon, all of Taejeon, Rep. of Korea

[73] Assignee: Korea Telecommunication Authority, Seoul, Rep. of Korea

[21] Appl. No.: 742,342

[22] Filed: Nov. 1, 1996

[30] Foreign Application Priority Data

Nov. 1, 1995 [KR] Rep. of Korea ..................... 95-39153

[51] Int. Cl.$^6$ .............................. G06F 7/00; G06F 17/14
[52] U.S. Cl. ............................... 364/715.011; 364/725.02
[58] Field of Search ..................... 364/715.011, 725.02; 382/250

[56] References Cited

U.S. PATENT DOCUMENTS 5,177,704   1/1993   D'Luna ..................................... 365/78
5,481,487   1/1996   Jang et al. ........................... 364/725.02
5,644,517   7/1997   Ho ...................................... 364/725.02

Primary Examiner—Tan V. Mai
Attorney, Agent, or Firm—Merchant, Gould, Smith, Edell, Welter and Schmidt

[57] ABSTRACT

A very large scale integrated circuit for performing a bit-serial matrix transposition operation, comprising an input shift register module for inputting N multiplied results of two N×N matrixes in the unit of k bits and outputting them in the unit of k/N bits in response to a load signal, a bit-serial transposition module for selecting k/N-bit data from the input shift register module in response to a switching control signal, an output multiplexer module for selecting k/N-bit data from the bit-serial transposition module in response to the switching control signal, and an output register module for inputting output data from the output multiplexer module in the unit of k/N bits and outputting N data in the unit of k bits. According to the present invention, when an N×N matrix transposition operation is performed, the operation occupancy of transposition cells becomes 100% after an N-input delay occurs. Also, the processing unit of data becomes smaller by using a bit-serial processing algorithm. Therefore, the high-speed operation can be performed. Further, the number of gates can be reduced in the integrated circuit. Moreover, because the integrated circuit has a pipelined structure, it is applicable to a multi-dimensional signal processing system requiring a high-speed processing operation.

7 Claims, 6 Drawing Sheets

VERY LARGE SCALE INTEGRATED CIRCUIT FOR PERFORMING BIT-SERIAL MATRIX TRANSPOSITION OPERATION

BACKGROUND OF THE INVENTION

1. Field of the Invention

The present invention relates in general to a very large scale integrated circuit (referred to hereinafter as VLSI) for performing a bit-serial matrix transposition operation in signal and video processing systems, and more particularly to a VLSI which is capable of converting data, which are inputted for a multi-dimensional matrix calculation operation in a system employing various transform algorithms, into bit-serial data to perform a matrix transposition operation at high speed.

2. Description of the Prior Art

Recently, a VLSI has been proposed to perform various transform algorithms, such as fast Fourier transform (PFT) and discrete cosine transform (DCT), in signal and video processing systems. In particular, a multi-dimensional signal processing system such as a high definition television (HDTV) or digital TV system requires a high-speed processing operation. Such a high-speed processing operation can be performed in a parallel or pipelined manner.

In most of the application fields, multi-dimensional data must be calculated on the basis of the transform algorithms. In this case, a matrix calculation operation is usually applied. In most of the transform algorithms, a multiplication operation is first performed with respect to two N×N matrixes and a matrix transposition operation is then performed to transpose rows and columns of the resultant matrix with each other. Then, the transposed result is multiplied by another N×N matrix. With this procedure repeated, the calculated result is obtained for a desired transform region.

Conventional matrix transposition methods can be classified into the following four types.

The first matrix transposition method is to store a matrix in a storage medium, such as a memory, in the order of row/column and read the matrix from the storage medium in the order of column/row. To this end, the first matrix transposition method basically requires techniques of generating an address and minimizing the using memory. For this reason, the first matrix transposition method is disadvantageous in that address calculation logic and storage medium must be provided and much time is required in accessing data. As a result, the first matrix transposition method is not applicable to a VLSI for large-scale or high-speed calculation.

The second matrix transposition method is to perform the opposite write/read operations using two random access memories (RAMs). The second matrix transposition method is disadvantageous in that many inputs and outputs are required for the memory read/write operations and the processing speed is limited to the operation speed of the RAM.

The third matrix transposition method is to interconnect registers in a proper manner to construct a network for obtaining the transposed result. In the third matrix transposition method, it is difficult to reduce the number of registers by N or more in the case where the given matrix is N×N and it is complex to route and control.

The fourth matrix transposition method is to improve the third matrix transposition method. In the fourth matrix transposition method, the control and routing are relatively simple and the structure is regular, although the number of required registers is $N^2$. The fourth matrix transposition method removes drawbacks such as the address calculation and the memory access time and makes the routing simple to minimize the routing delay. Therefore, the fourth matrix transposition method has the effect of making the processing speed very high. However, in the fourth matrix transposition method, a delay may occur in cells for the control of internal register connection and a demultiplexer and a multiplexer connected respectively to input and output stages. Such a delay becomes a more serious problem when input data has a wider bit width.

SUMMARY OF THE INVENTION

Therefore, the present invention has been made in view of the above problems, and it is an object of the present invention to provide a VLSI which is capable of converting input data into bit-serial data to perform a bit-serial matrix transposition operation at high speed.

In accordance with the present invention, the above and other objects can be accomplished by a provision of a very large scale integrated circuit for performing a bit-serial matrix transposition operation, comprising input shift register means for inputting N multiplied results of two N×N matrixes in the unit of k bits and outputting them in the unit of k/N bits in response to a load signal; bit-serial transposition means for selecting k/N-bit data from the input shift register means in response to a switching control signal; output multiplexer means for selecting k/N-bit data from the bit-serial transposition means in response to the switching control signal; and output register means for inputting output data from the output multiplexer means in the unit of k/N bits and outputting N data in the unit of k bits.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1A:
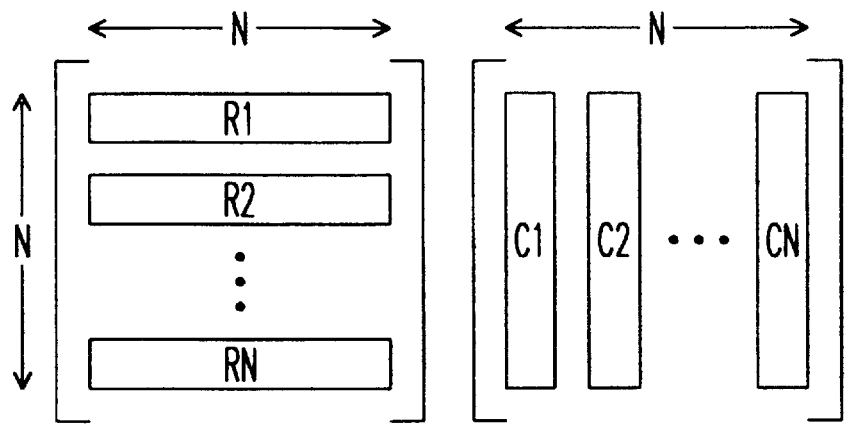
FIG. 1A is a view illustrating a multiplication operation for two N×N matrixes.
Figure 1B:
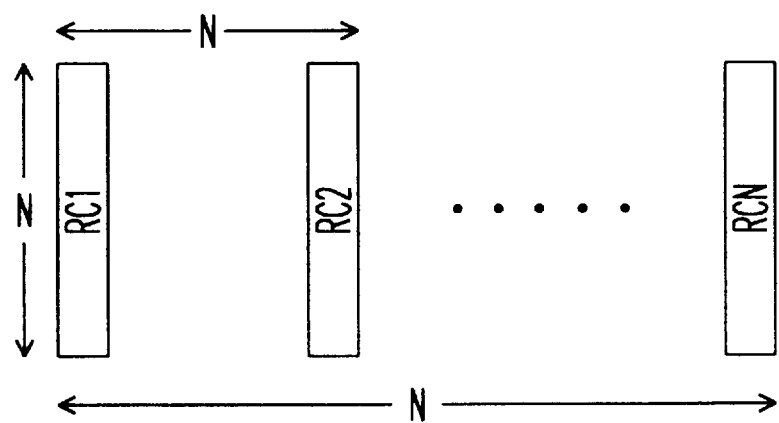
FIG. 1B is a view illustrating the multiplied result in FIG. 1A.

FIG. 1A is a view illustrating a multiplication operation for two N×N matrixes and FIG. 1B is a view illustrating the multiplied result in FIG. 1A. Generally, in a matrix calculation operation such as two-dimensional transform, a multiplication operation is first performed with respect to two N×N matrixes and a matrix transposition operation is then performed to transpose rows and columns of the resultant matrix with each other. Then, the transposed result is multiplied by the remaining N×N matrix. In the multiplication operation for the two N×N matrixes, as shown in FIG. 1A, elements of a row R1 of the first matrix are first multiplied by elements of a column C1 of the second matrix, respectively, and the multiplied results are then added. Then, the remaining rows R2–RN of the first matrix are multiplied by the column C1 of the second matrix and the multiplied results are then added, in the same manner as the row R1 of the first matrix. As a result, N results are obtained. With this calculation operation repeated N times, the calculated results can be obtained in the form of N×N matrix. The calculated results RC1–RCN are outputted at a period of N clocks, as shown in FIG. 1B.

The principle of the present invention is to sequentially input data in the unit of N and successively perform multiplication, transposition and multiplication operations with respect to three N×N matrixes in a bit-serial manner. The transposition of input data for the second matrix multiplication operation is automatically performed at the matrix transposition stage. Therefore, the present invention has the effect of reducing the number of registers in the above-mentioned conventional third matrix transposition method.

In the present invention, when data as a result of the calculation has a bit width of k bits, it is applied to a transposition module in the unit of k/N bits, where k=nN and n=1, 2, . . . , . As a result, the transposition operation is performed with respect to k/N-bit-serial input data.

The transposition of N×N matrix can be defined as follows:

$X_{ij}=X_{ji}$ where, i and j are 1, 2 . . . , N.

For example, assuming that k=8 and N=4, the transposition of N×N matrix can be expressed as follows:

$$\begin{bmatrix} X_{11}X_{12}X_{13}X_{14} \\ X_{21}X_{22}X_{23}X_{24} \\ X_{31}X_{32}X_{33}X_{34} \\ X_{41}X_{42}X_{43}X_{44} \end{bmatrix} \xrightarrow{TRANSPORTATION} \begin{bmatrix} X_{11}X_{21}X_{31}X_{41} \\ X_{12}X_{22}X_{32}X_{42} \\ X_{13}X_{23}X_{33}X_{43} \\ X_{14}X_{24}X_{34}X_{44} \end{bmatrix}$$

Figure 2:
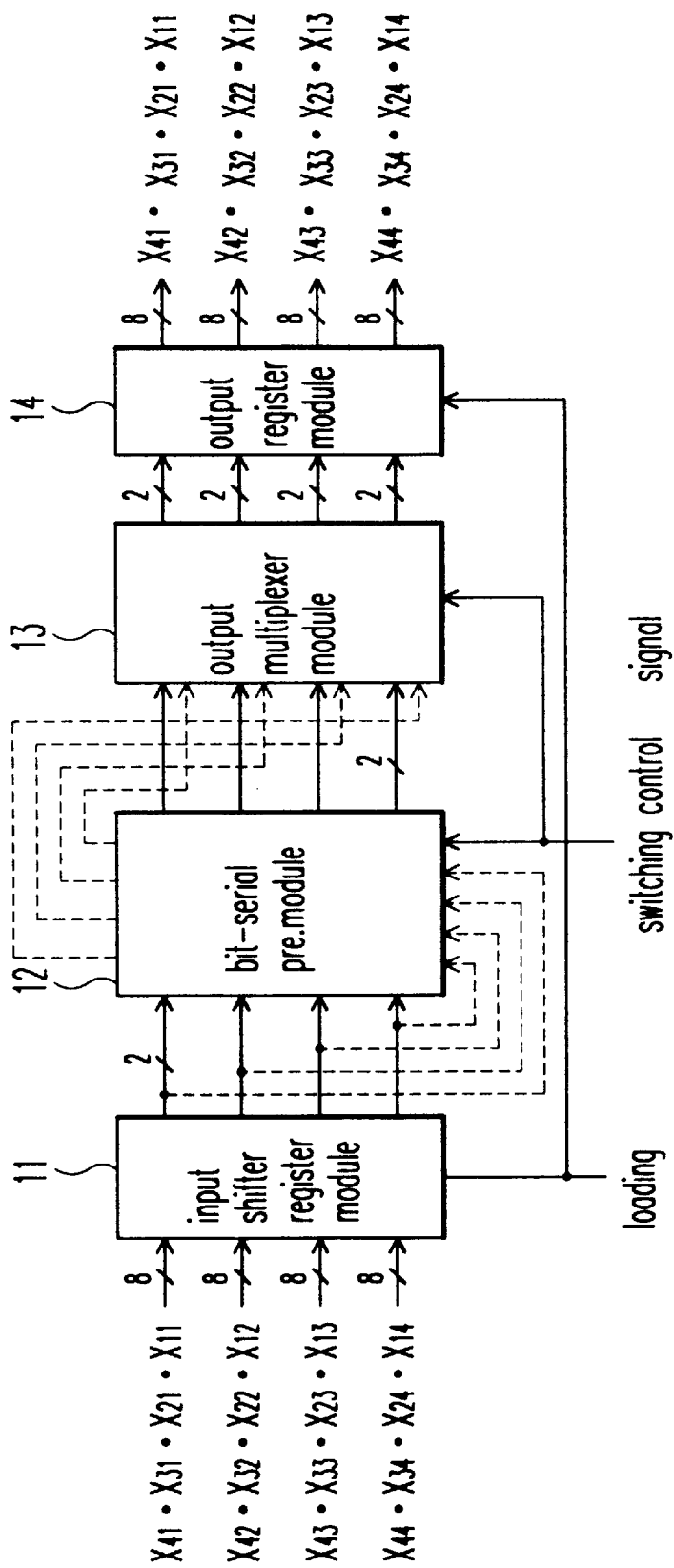
FIG. 2 is a block diagram illustrating the construction of a VLSI for performing a bit-serial matrix transposition operation in accordance with the present invention.

A novel 2-bit-serial matrix transposition arrangement utilizing the calculated results as shown in Fig. 1B is shown in FIG. 2.

FIG. 2 is a block diagram illustrating the construction of a VLSI for performing a bit-serial matrix transposition operation in accordance with the present invention. As shown in this drawing, the VLSI comprises an input shift register module 11, a bit-serial transposition module 12, an output multiplexer module 13 and an output register module 14.

The input shift register module 11 is adapted to input four multiplied results of two 4×4 matrixes in the unit of 8 bits and output them in the unit of 2 bits. The bit-serial transposition module 12 is adapted to select solid line data from the input shift register module 11 for the first 16-clock period and dotted line data from the input shift register module 11 for the second 16-clock period. The output multiplexer module 13 is adapted to select solid line data from the bit-serial transposition module 12 for the first 16-clock period and dotted line data from the bit-serial transposition module 12 for the second 16-clock period. As a result, the transposed result begins to be outputted after the initial 16 clocks are delayed. The output register module 14 is adapted to input output data from the output multiplexer module 13 in the unit of 2 bits and output four data in the unit of 8 bits. In the case where the output data from the output multiplexer module 13 is used as a bit-serial input for the subsequent matrix multiplication operation, the output register module 14 is not necessary. The output register module 14 is operated in the opposite manner to the input shift register module 11 to unify 2-bit-serial data into 8-bit data.

Figure 3:
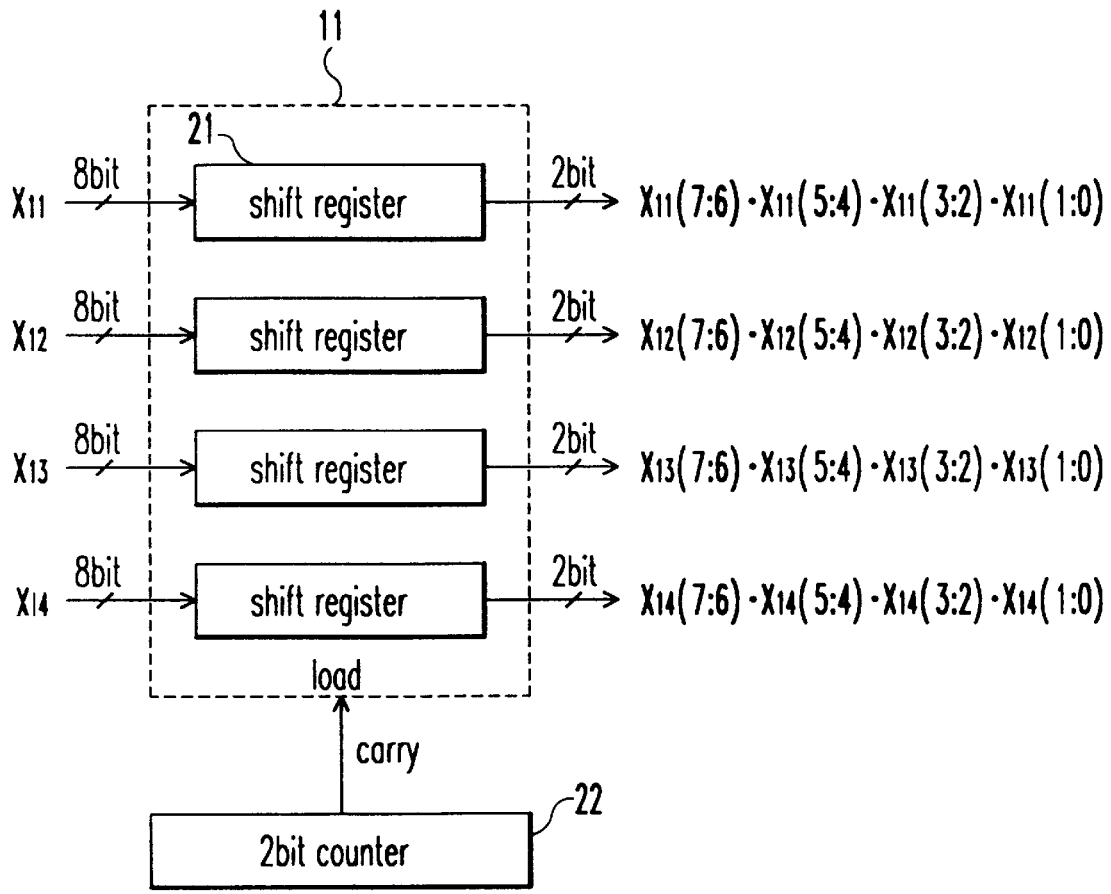
FIG. 3 is a block diagram illustrating the construction of an input shift register module in FIG. 2.

FIG. 3 is a block diagram illustrating the construction of the input shift register module 11 in FIG. 2. As shown in this drawing, the input shift register module 11 includes four shift registers 21 being loaded with input data in response to a carry signal from a 2-bit counter 22. If the input shift register module 11 inputs the four multiplied results, then it outputs the same value for a 4-clock period. As a result, the input shift register module 11 outputs the calculated result of the first row by 2 bits for the 4-clock period from the first row loaded time point to the subsequent row loaded time point.

Figure 4:
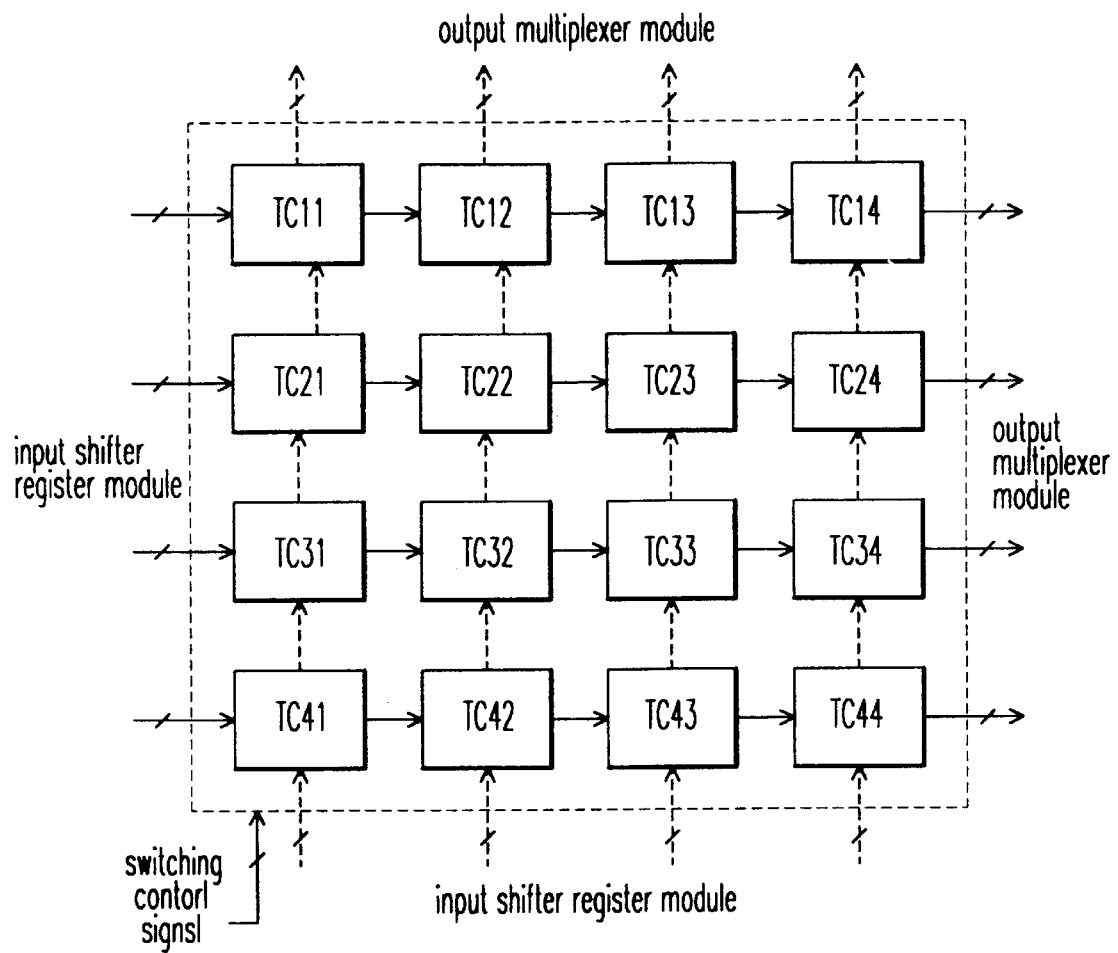
FIG. 4 is a block diagram illustrating the construction of a bit-serial transposition module in FIG. 2.

FIG. 4 is a block diagram illustrating the construction of the bit-serial transposition module 12 in FIG. 2. As shown in this drawing, the bit-serial transposition module 12 includes 16 transposition cells TC 31. A period of 16 clocks is required until the solid line data from the input shift register module 11 is transferred from the transposition cell TC11 to the transposition cell TC14. At that time the solid line data from the input shift register module 11 are transferred to all the transposition cells TC14, TC24, TC34 and TC44, the dotted line data from the input shift register module 11 begin to be transferred to the transposition cells in response to a switching control signal. As a result, the dotted line data from the input shift register module 11 are inputted and outputted for the subsequent 16-clock period. At this time, the solid line data from the input shift register module 11 are not inputted and outputted.

Figure 5:
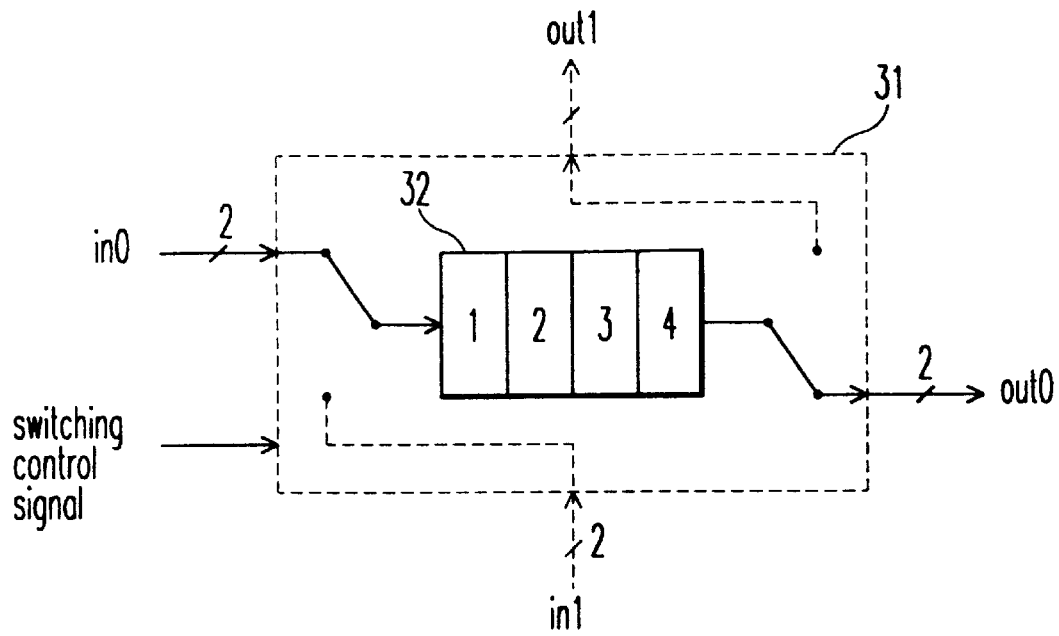
FIG. 5 is a block diagram illustrating the construction of a transposition cell in FIG. 4.

FIG. 5 is a block diagram illustrating the construction of the transposition cell TC in FIG. 4. As shown in this drawing, the transposition cell TC includes four 2-bit registers, a 2-bit multiplexer provided at an input stage of the 2-bit registers and a 2-bit demultiplexer provided at an output stage of the 2-bit registers. The 2-bit registers are adapted to transfer the input data. The 2-bit multiplexer is adapted to select in0/in1 in response to the switching control signal. The 2-bit demultiplexer is adapted to select out0/out1 in response to the switching control signal.

Figure 6:
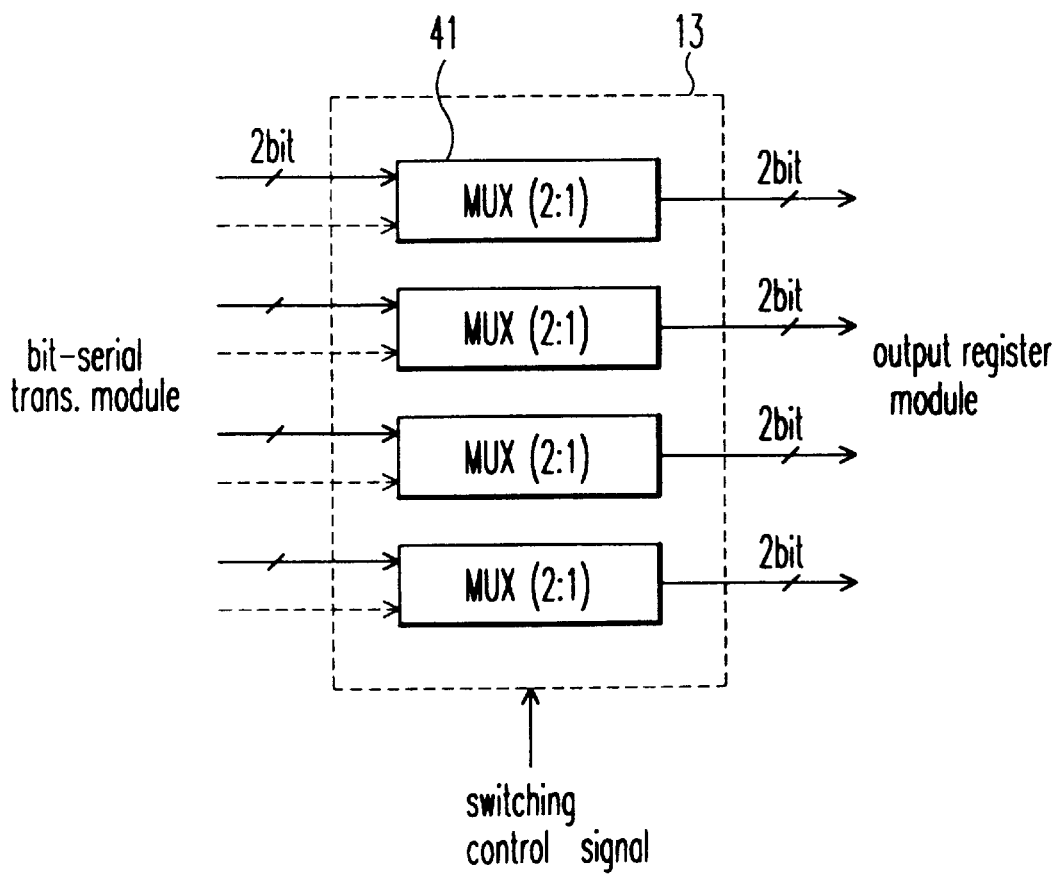
FIG. 6 is a block diagram illustrating the construction of an output multiplexer module in FIG. 2.

FIG. 6 is a block diagram illustrating the construction of the output multiplexer module 13 in FIG. 2. As shown in this drawing, the output multiplexer module 13 includes four 2-bit 2:1 multiplexers 41 for selecting the output data from the bit-serial transposition module 12. The output multiplexer module 13 is adapted to select the solid line data from the bit-serial transposition module 12 for the first 16-clock period and the dotted line data from the bit-serial transposition module 12 for the second 16-clock period. To this end, the output multiplexer module 13 includes the four 2-bit 2:1 multiplexers 41. This construction has excellent processing speed and complexity as compared with the 8-bit demultiplexer.

Figure 7:
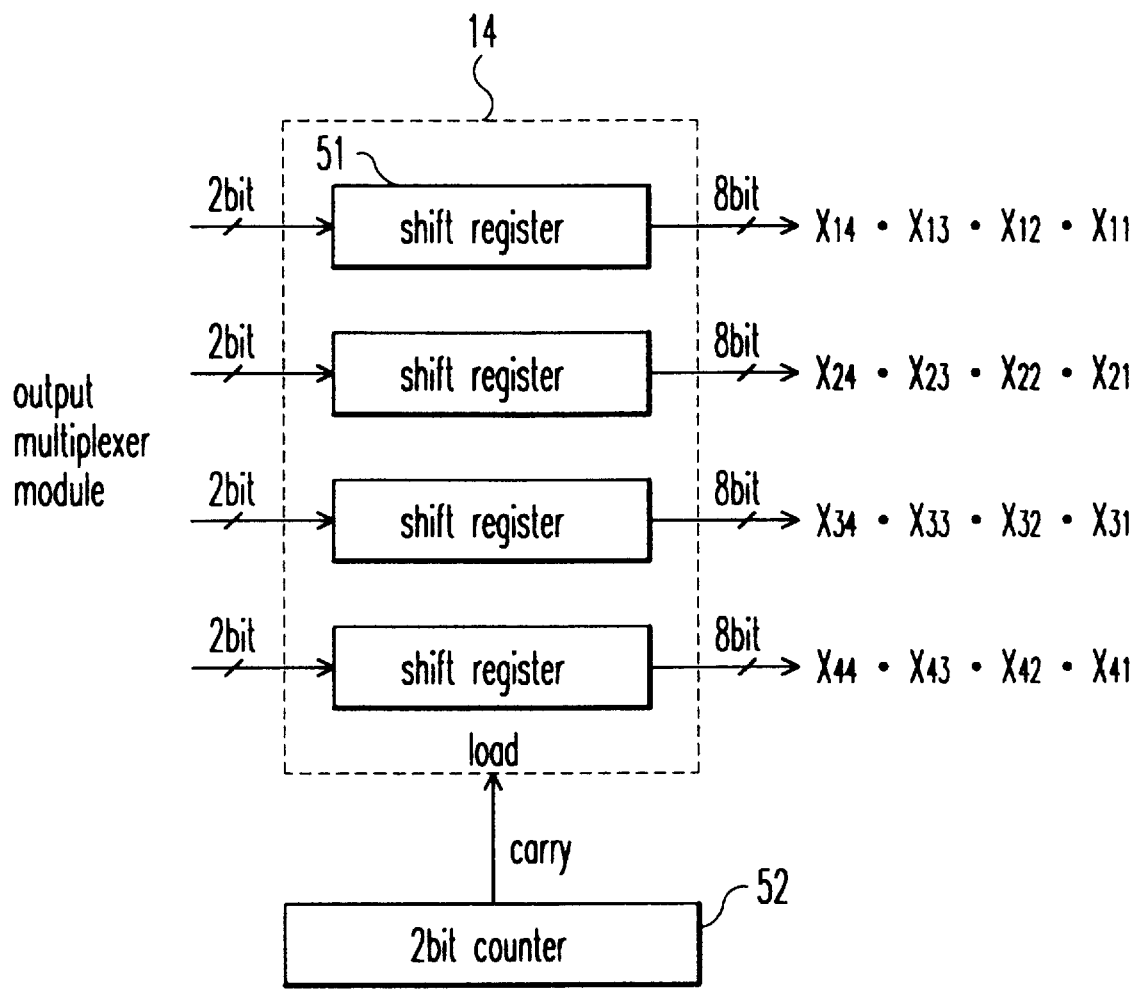
FIG. 7 is a block diagram illustrating the construction of an output register module in FIG. 2.

FIG. 7 is a block diagram illustrating the construction of the output register module 14 in FIG. 2. As shown in this drawing, the output register module 14 includes four registers 51. Each of the registers 51 is adapted to unify the four 2-bit data from the output multiplexer module 13 into one 8-bit data. To this end, each of the registers 51 stores the four 2-bit data therein for the 4-bit period and outputs 8-bit data at a time. Therefore, the processing speed is high as in a general latch and the construction and control are simple.

As is apparent from the above description, according to the present invention, when the N×N matrix transposition operation is performed, the operation occupancy of the transposition cells becomes 100% after the N-input delay occurs. Also, the processing unit of data becomes smaller by using the bit-serial processing algorithm. Therefore, the high-speed operation can be performed. Further, the number of gates can be reduced in the VLSI. Moreover, because the VLSI has the pipelined structure, it is applicable to a multi-dimensional signal processing system requiring a high-speed processing operation, such as an HDTV or digital TV system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A very large scale integrated circuit for performing a bit-serial matrix transposition operation, comprising:

input shift register means for inputting N multiplied results of two N×N matrixes in the unit of k bits and outputting them in the unit of k/N bits in response to a load signal;

bit-serial transposition means for selecting k/N-bit data from said input shift register means in response to a switching control signal;

output multiplexer means for selecting k/N-bit data from said bit-serial transposition means in response to the switching control signal; and output register means for inputting output data from said output multiplexer means in the unit of k/N bits and outputting N data in the unit of k bits.

2. A very large scale integrated circuit for performing a bit-serial matrix transposition operation, as set forth in claim 1, wherein said input shift register means includes N shift registers.

3. A very large scale integrated circuit for performing a bit-serial matrix transposition operation, as set forth in claim 1, wherein the load signal to said input shift register means is a carry signal from a $\log_2 N$-bit counter.

4. A very large scale integrated circuit for performing a bit-serial matrix transposition operation, as set forth in claim 1, wherein said bit-serial transposition means includes $N^2$ transposition cells.

5. A very large scale integrated circuit for performing a bit-serial matrix transposition operation, as set forth in claim 4, wherein each of said transposition cells includes:

N k/N-bit registers;

a k/N-bit multiplexer provided at an input stage of said k/N-bit registers; and a k/N-bit demultiplexer provided at an output stage of said k/N-bit registers.

6. A very large scale integrated circuit for performing a bit-serial matrix transposition operation, as set forth in claim 1, wherein said output multiplexer means includes N k/N-bit multiplexers.

7. A very large scale integrated circuit for performing a bit-serial matrix transposition operation, as set forth in claim 1, wherein said output register means include N registers being loaded in response to a carry signal from a $\log_2 N$-bit counter.

* * * * *